United States Patent [19]

Hilgendorff et al.

[11] Patent Number: 4,695,380
[45] Date of Patent: Sep. 22, 1987

[54] DIAPHRAGM-EQUIPPED FLUID TREATING APPARATUS

[75] Inventors: Walter Hilgendorff, Tespe; Gerhard Kahn; Jürgen Kaschemekat, both of Geesthacht, all of Fed. Rep. of Germany

[73] Assignee: GKSS Forschungszentrum Geesthacht GmbH, Geesthact, Fed. Rep. of Germany

[21] Appl. No.: 835,210

[22] Filed: Mar. 3, 1986

[30] Foreign Application Priority Data

Mar. 6, 1985 [DE] Fed. Rep. of Germany ....... 3507908

[51] Int. Cl.$^4$ .............................................. B01D 13/00
[52] U.S. Cl. ................... 210/347; 210/433.2
[58] Field of Search ...................... 210/346, 347, 433.2, 210/321.1, 336, 343, 344

[56] References Cited

U.S. PATENT DOCUMENTS 3,343,681 9/1967 Madden ......................... 210/346 X
4,228,014 10/1980 Timm et al. .................... 210/347 X
4,401,566 8/1983 Igari et al. ..................... 210/433.2 X

FOREIGN PATENT DOCUMENTS 2811826 9/1978 Fed. Rep. of Germany ... 210/321.3

Primary Examiner—Frank Spear
Attorney, Agent, or Firm—Spencer & Frank

[57] ABSTRACT

A fluid treating apparatus has a plurality of chambers arranged in a stack along the apparatus axis; inlet and outlet ports in end plates as well as a central channel for introducing fluid into and removing fluid from the apparatus; and a plurality of fluid-impervious diaphragms situated in the chambers in an orientation generally perpendicular to the axis. The fluid is guided along the diaphragms generally radially inwardly. The apparatus further has a plurality of support frames arranged in a stack along the axis. Each support frame includes an inner ring spacedly surrounded by an outer ring. The radially inner face of the outer ring and the radially outer face of the inner ring of each support frame together define radially outer and radially inner boundaries, respectively, of the chambers. The radially outer faces of the outer rings together form an outer wall face of the apparatus, and the radially inner faces of the inner rings surround the central channel. Each outer ring has a supporting face engaging a radially outer marginal surface portion of an adjoining diaphragm, and each diaphragm has a central aperture in axial alignment with each inner ring and a passage at a radially outer part for allowing flow of fluid axially through each diaphragm.

14 Claims, 12 Drawing Figures

DIAPHRAGM-EQUIPPED FLUID TREATING APPARATUS

BACKGROUND OF THE INVENTION

This invention relates to a fluid treating apparatus including diaphragms which are arranged in a stacked, spaced relationship to one another and which define a central passage for withdrawing at least one separated substance from a fluid mixture. The apparatus has two end plates provided with ports for introducing the mixture into the apparatus and for withdrawing the separated substances, as well as the mixture residue. The fluid flows diametrally inwardly along the diaphragms and is withdrawn centrally, in an axial direction.

An apparatus of the above-outlined type is disclosed, for example, in German Offenlegungsschrift (Non-examined Published Application) No. 2,811,826 in which the individual diaphragm cells are stacked in a constant distance from one another. Each diaphragm cell is anchored along its outer periphery in a hardened mass introduced separately into the chamber. Consequently, a subsequent disassembly of the apparatus and thus replacement of diaphragm elements is not possible. The diaphragm holding arrangement of this type requires a pressure-resistant jacket on which the hardening mass bonds. Such a method of manufacture is very time-consuming and involves significant expense.

SUMMARY OF THE INVENTION

It is an object of the invention to provide an improved apparatus of the above-outlined type which, for performing a material separation by means of reverse osmosis, ultra-filtration, gas separation or pervaporation, is equipped with simple means and which, in particular, may be used for treating charged and/or soiled water highly likely to cause scaling or fouling.

This object and others to become apparent as the specification progresses, are accomplished by the invention, according to which, briefly stated, the fluid treating apparatus has a plurality of chambers arranged in a stack along the apparatus axis; inlet and outlet ports in end plates as well as a central channel for introducing fluid into and removing fluid from the apparatus; and a plurality of fluid-impervious diaphragms situated in a spaced relationship in the chambers in an orientation generally perpendicular to the axis. The fluid is guided along the diaphragms generally radially inwardly. The apparatus further has a plurality of support frames arranged in a stack along the axis. Each support frame includes an inner ring spacedly surrounded by an outer ring. The radially inner face of the outer ring and the radially outer face of the inner ring of each support frame together define radially outer and radially inner boundaries, respectively, of the chambers. The radially outer faces of the outer rings together form an outer wall face of the apparatus, and the radially inner faces of the inner rings surround the central channel. Each outer ring has a supporting face engaging a radially outer marginal surface portion of an adjoining diaphragm, and each diaphragm has a central aperture in axial alignment with each inner ring and a passage at a radially outer part for allowing flow of fluid axially through each diaphragm.

It is a particular advantage of the apparatus according to the invention that the viscosity changes of the fluid mixture (because of the separation of permeate or substances) may be compensated for by the cross-sectional changes of the chambers. It is a further advantage of the invention that the velocity changes resulting from the above arrangement cause pressure differential changes and the dwell period of the fluid mixture, for example, in the range of high concentration towards the end of the process line, may be influenced. It is further possible to set the pressure variation throughout the process line in such a manner that towards the end of the process line there is achieved a pressure gain with an increase of the diaphragm output.

BRIEF DESCRIPTION OF THE DRAWING

FIG. 4 is a top plan view of a component shown in FIG. 2a.

DESCRIPTION OF THE PREFERRED EMBODIMENTS

Figure 1:
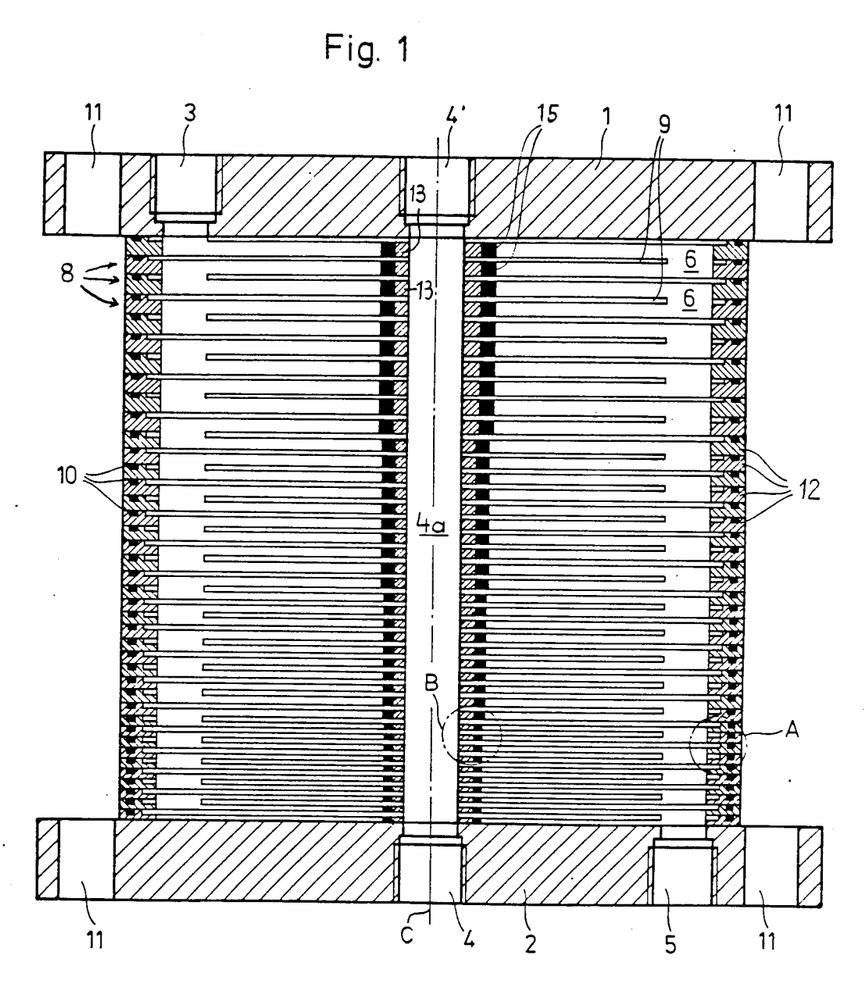
FIG. 1 is a schematic axial sectional view of a preferred embodiment of the invention.
Figure 2A:
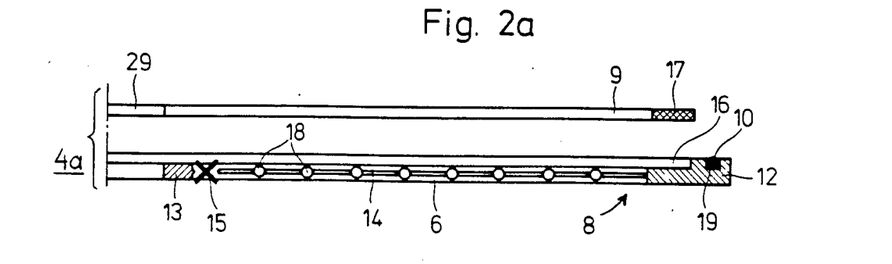
FIGS. 2a, 2b, 2c and 2d are schematic axial sectional views of four variants of some components of the construction shown in FIG. 1, illustrated at an enlarged scale relative thereto.
Figure 3:
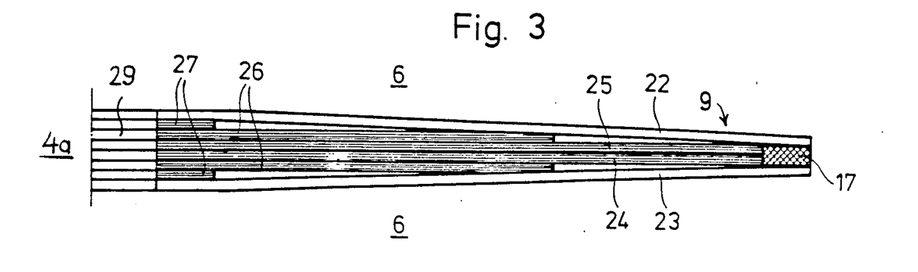
FIG. 3 is an axial sectional view of details of a component shown in FIG. 1, illustrated at an enlarged scale relative thereto.

Turning now to FIGS. 1, 2a and 3, there is shown therein a preferred embodiment of the invention.

FIG. 1 illustrates the entire apparatus in a simplified axial cross section. The longitudinal apparatus axis is designated at C. Between a first end plate 1 having a mixture inlet 3 and a permeate outlet 4' and a second end plate 2 having a concentrate outlet 5 and a permeate outlet 4 there are provided a plurality of serially arranged, stacked mixture chambers 6. Each mixture chamber 6 is bounded at its radially inner periphery—at the axial passage 4a interconnecting the outlets 4, 4' —by a soft-material seal 15 and is bounded at the outer periphery by a diaphragm support frame 8. As will be described in greater detail later, in each mixture chamber 6 there is held a diaphragm pocket assembly 9. The flow passage cross sections of the mixture chambers 6 are reduced in the axial direction, as viewed from inlet port 3 towards outlet port 5, by the provision of support frames 8 of gradually reduced axial dimensions. This arrangement is particularly advantageous for the event that the viscosity of the mixture changes only very slightly, if at all, as the permeate is gradually extracted. In case of appreciable viscosity changes, on the other hand, a reverse arrangement may be called for in order to gradually widen the flow passage cross section of the mixture chambers 6 as viewed axially from the inlet 3 towards the outlet 5. The absolute size of the flow passage cross sections is adapted to the type and properties of the fluid mixture to be treated. The flow passage cross sections may be optimized by means of a computer program, based on the maximum permeate exploitation with the smallest energy input and the longest time period between rinsing intervals. In the described case, the cross sections change from one mixture chamber 6 to the other.

The individual stacked support frames 8 have in their outer peripheral zone seals 10 which seal the mixture chambers 6 outwardly without the need of an additional protective jacket. For the central axial channel 4a no tube insert is needed; the permeate flows from the individual diaphragm pocket assemblies 9 directly radially into the channel 4a. The two end plates 1 and 2 are tightened to one another—with the support frames 8 clamped therebetween—by bolts (not shown) passing through aligned holes 11 in the outer peripheral zone of the end plates 1 and 2.

FIG. 2a illustrates an axial sectional view of details of the chamber construction. The support frame 8 is formed of an outer ring 12 and an inner ring 13 between which there is arranged a grid 14. The outer radial faces of the stacked outer rings 12 together form an outer wall face of the apparatus. A soft-material seal 15 separates the mixture chamber 6 from the central channel 4a. The outer ring 12 has a circumferential recessed ledge 16 which serves as a support for the outer peripheral edge zone 17 (adhesive edge) of the diaphragm pocket assembly 9.

Structural details of the diaphragm pocket assembly 9 are illustrated in FIG. 3. Between the securing edge (adhesive edge) 17 and the central channel 4a there are provided two superposed fluid-impervious diaphragm discs 22, 23, each bounding two adjoining mixture chambers 6. Between the two diaphragms 22, 23 there extend porous mats 24, 25 which also act as spacers for the diaphragms 22, 23. Viewed radially inwardly, additional porous mats 26 and 27 are provided which increase the total porous mat thickness in that direction. In simpler embodiments the mat thickness maybe maintained constant throughout the radial dimension of the diaphragm pocket assembly 9. The varying thickness of the illustrated embodiment results in better guidance of the permeate. The thickness of each 24, 25, 26 and 27 is approximately 0.15 mm.

Reverting to FIG. 2a, the diaphragm pocket assembly 9 is situated above the grid 14, the inner ring 13 and the seal 15 so that the permeate may flow without impediment from the reverse side of the diaphragms 22, 23 through the porous layer 24–27, while the fluid mixture is prevented by the soft-material seal 15 from gaining access to the central channel 4a. Each diaphragm pocket assembly 9—including the diaphragms 22, 23—has a central aperture 29 which corresponds to the inner diameter of the inner ring 13 and bounds the central channel 4a. On the upper radial face each outer ring 12 has a groove 19 in which the seal 10 is seated.

Figure 2B:
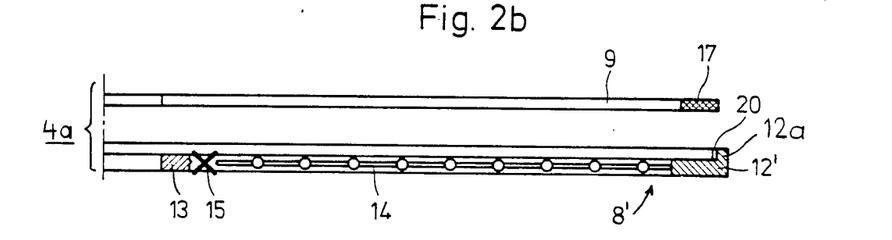
Figure 2C:
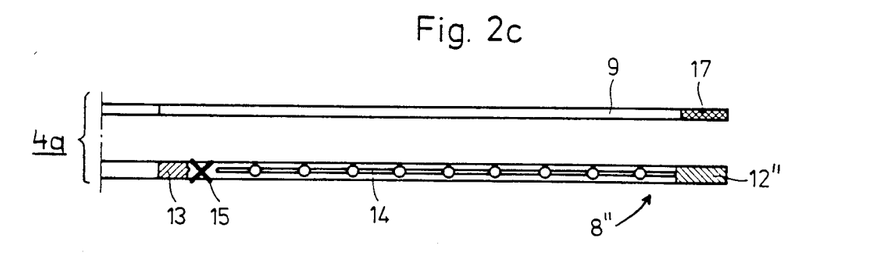
Figure 2D:
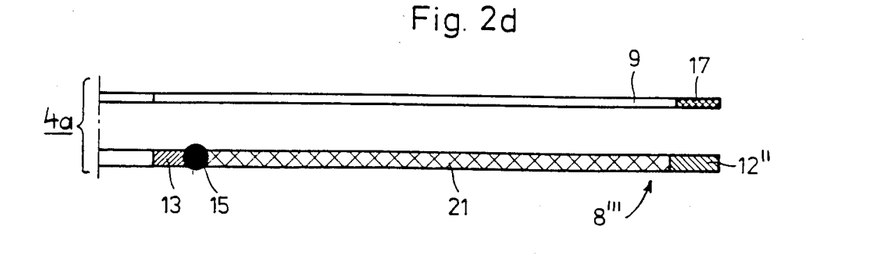

FIGS. 2b–2d show variants of the FIG. 2a construction. These variants, however, because of the omitted seal 10, may be used only under certain conditions without an additional housing jacket. In FIG. 2b the outer ring 12 has a raised edge 12a, at the radially inner flank of which a clamping location 20 where the outer peripheral edge of the edge zone 17 is anchored and sealed. In the variant according to FIG. 2c, the outer ring 12″ has no raised edge, while in the FIG. 2d variant, the grid 14 of the other embodiments is replaced by a woven fabric 21. The individual components 12, 13, 14 or 21 of the support frames 8 (FIG. 2a), 8′ (FIG. 2b), 8″ (FIG. 2c) and 8‴ (FIG. 2d) may be mounted as individual components or may be manufactured by a spraying process as unitary pieces together with the soft-material seal 7 and 10.

Figure 4:
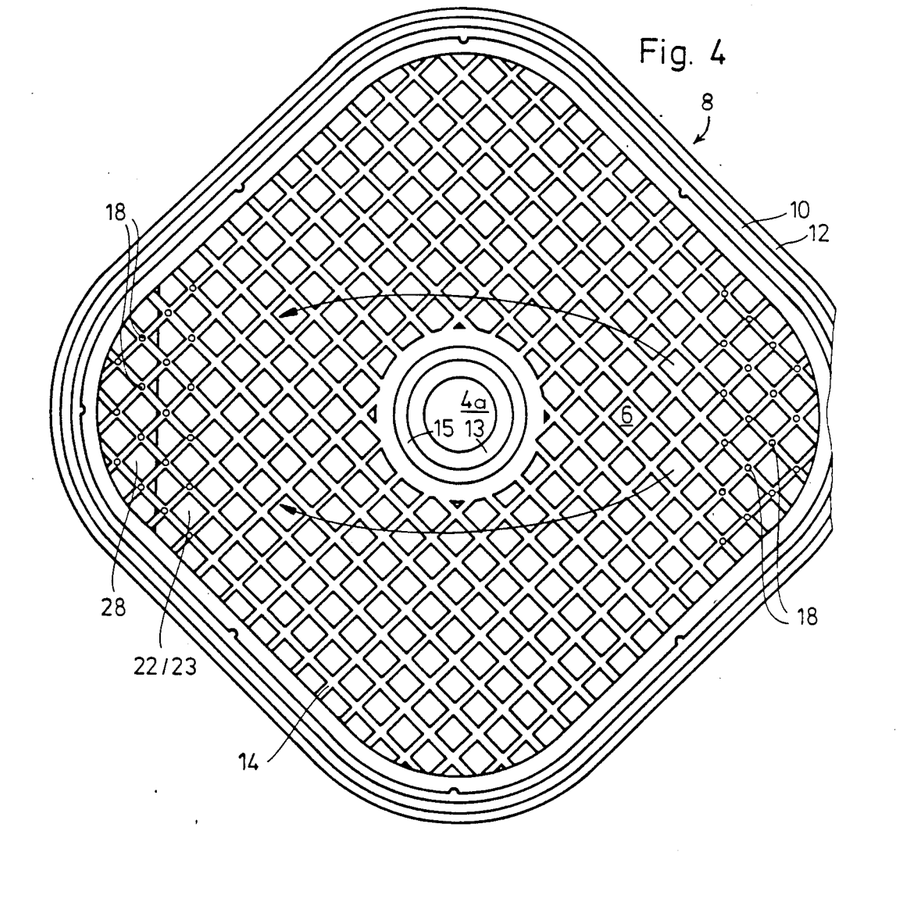

Turning now to FIG. 4, there is shown a top view of the support frame 8 used in the FIG. 1 construction and also illustrated in FIG. 2a. The support frame 8 is of generally square outline. On the top face of the outer ring 12 there extends the seal 10 and on the inner ring 13 there is supported the soft-material seal 15. The grid 14 has, on both faces, raised dots 18 which are situated in two diagonally opposite corner zones and which serve for maintaining a distance and supplying a support for the underlying and overlying parts of the diaphragms 22 and 23. The mixture flows in this construction from a location above the drawing plane of FIG. 4 into the mixture chamber 6 and then flows in the direction of the two arrows towards the oppositely lying corner where it passes axially through an opening (cutout) 28 provided in the diaphragm pocket assembly 9—including the diaphragms 22, 23—into the underlying mixture chamber 6.

Figure 5:
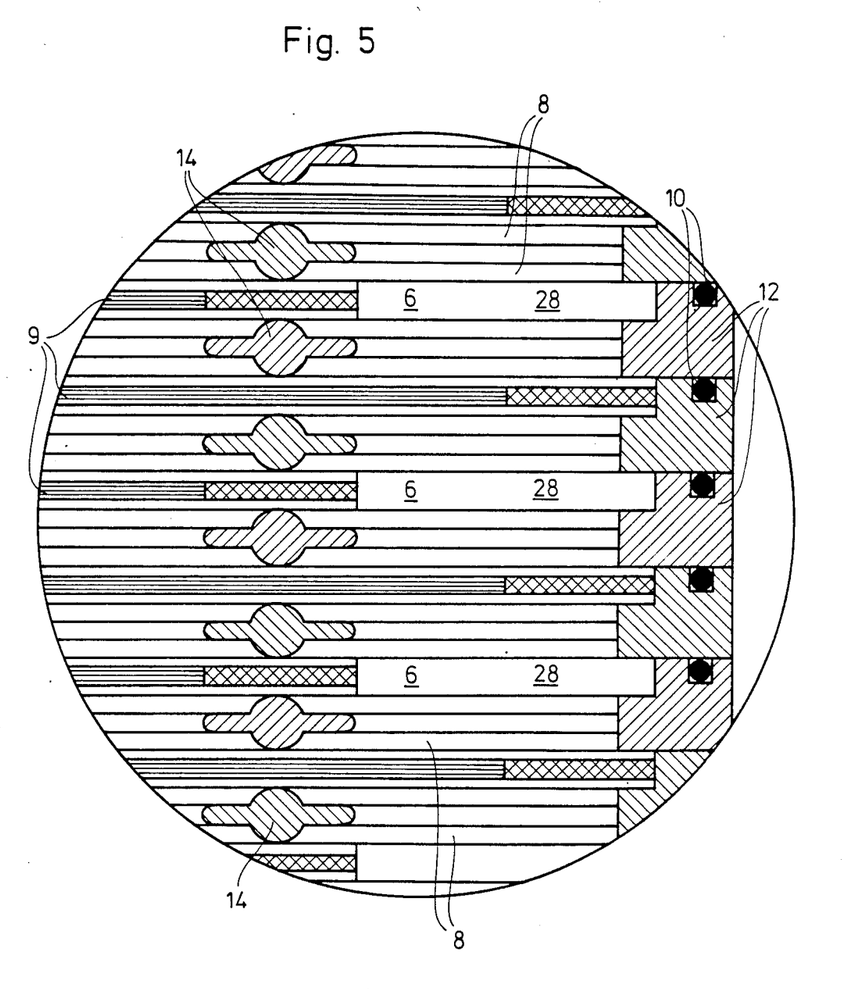
FIG. 5 is an enlarged axial sectional view of inset A of FIG. 1.

Turning now to FIG. 5, there is illustrated therein an enlarged sectional view of the inset A shown in FIG. 1. FIG. 5 illustrates in detail, in particular, the stacking arrangement of the individual support frames 8 with the outer seals 10 on the outer rings 12 as well as the arrangement of the grid 14 and the diaphragm pocket assembly 9. The fluid flows in succession through the mixture chambers 6. Successive diaphragm pocket assemblies 9 are offset 180° to one another, whereby the cutout 28 (FIG. 4) always effects a passage of the fluid into the successive, underlying mixture chamber 6.

Figure 6:
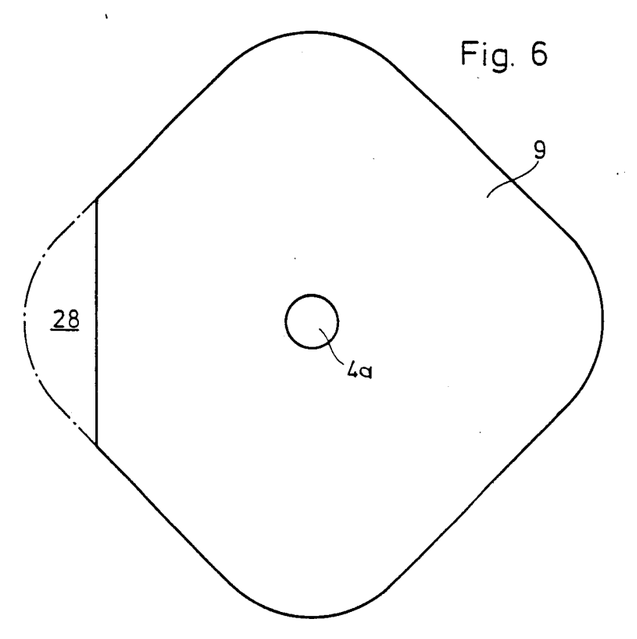
FIG. 6 is a top plan view of a component shown in FIG. 1.
Figure 7:
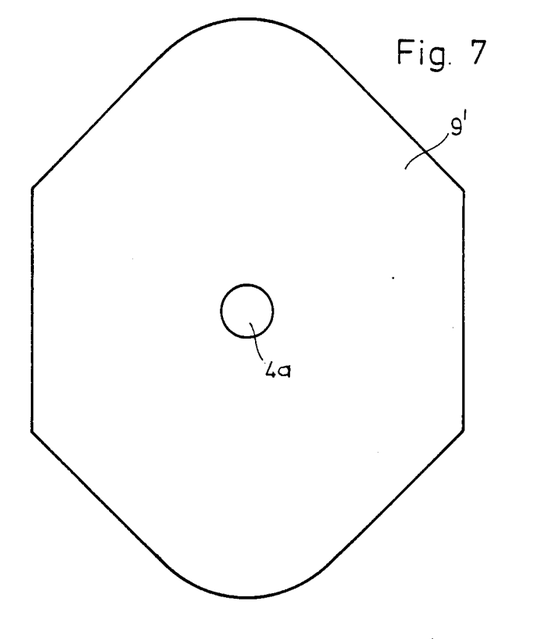
FIG. 7 is a top plan view of the same component, having a modified configuration compared to that of FIG. 6.

FIG. 6 is a top plan view of the quadratic diaphragm pocket assembly 9. If, instead of a serial flow a parallel flow through the mixture chambers 6 is desired, cutouts at two diagonally opposite corners of the diaphragm pocket assembly 9′ are provided to constitute flow-through openings, as illustrated in FIG. 7.

Figure 8:
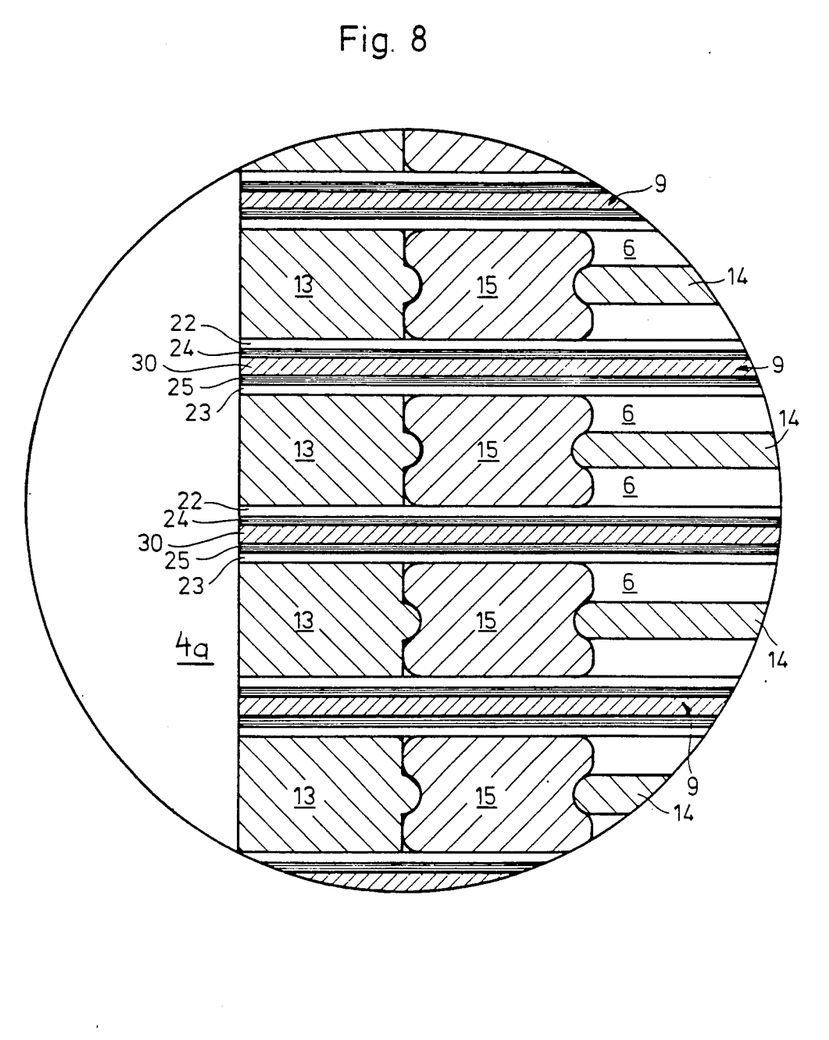
FIG. 8 is an enlarged axial sectional view of inset B of FIG. 1.

Turning now to FIG. 8, there is shown therein a detailed enlarged sectional view of the inset B of FIG. 1. The inner rings 13 of the support frames 8 as well as the soft-material seals 15 separate the mixture chambers 6 from the central channel 4a. Therebetween there are positioned the diaphragm pocket assemblies 9 of the above-described type (in this illustration parallel-arranged diaphragms 22 and 23 are shown). The mats 24 and 25 permit a passage of the permeate from the reverse side of the diaphragm 22 and 23 into the central channel 4a. The inner edges of the grid 14 (in case the components are not formed as an integral piece in a spraying process) are supported by the soft-material seals 15. Between the porous mats 24, 25 a pressure load resistant plate 30 is disposed.

Figure 9:
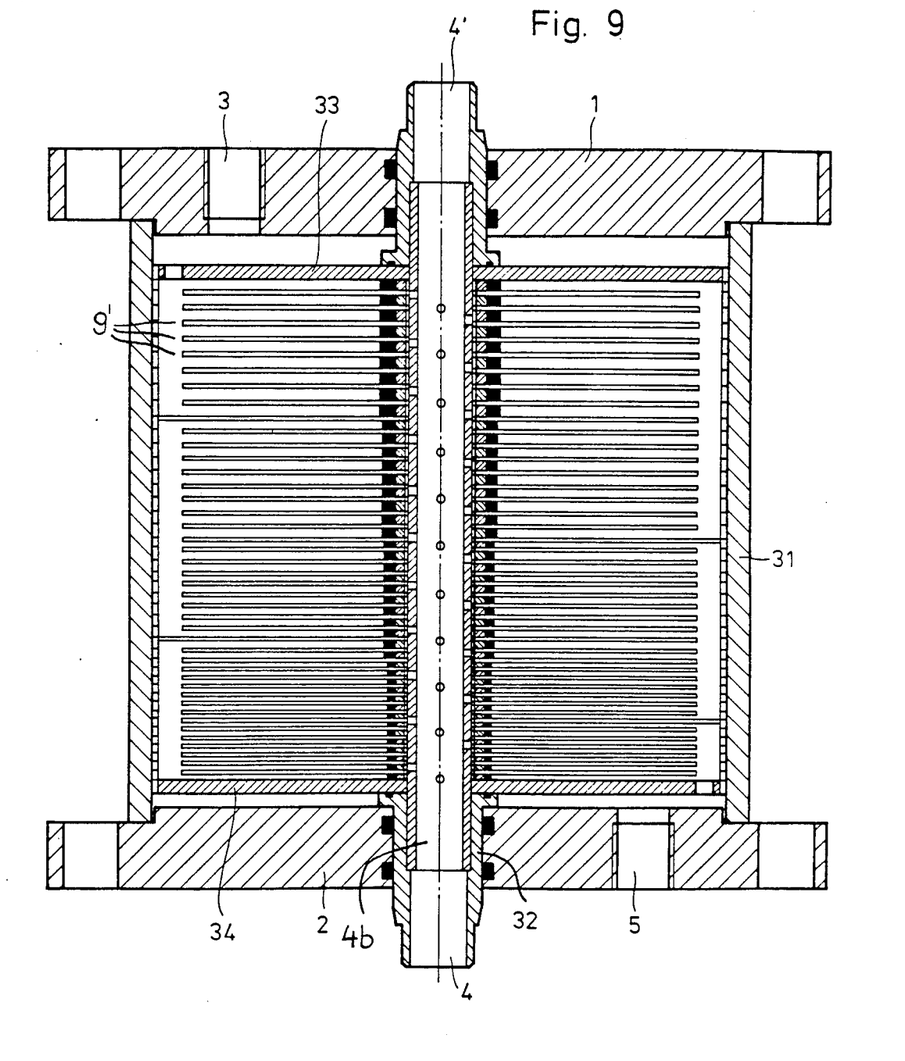
FIG. 9 is a schematic axial sectional view of another preferred embodiment of the invention.

Turning now to FIG. 9, the structure shown therein corresponds in principle to that illustrated in FIG. 1, except that there is provided an outer jacket 31, a tube insert 32 for defining the central channel 4b as well as two baffle plates 33 and 34 at both ends. In this embodiment the adaptation of the flow passage cross section to the fluid mixture is effected by the varying channel height of the diaphragm pocket assemblies 9 which are arranged in stacks in each mixture chamber and are exposed to a parallel fluid flow. For this purpose in each stack the corner passages of the pocket assemblies 9′ are all in alignment with one another. The permeate flows into the central channel 4a through the openings uniformly provided in the wall of the tube insert 32. Additionally, a collecting chamber may be provided about the tube insert 32.

It will be understood that the above description of the present invention is susceptible to various modifications, changes and adaptations, and the same are intended to be comprehended within the meaning and range of equivalents of the appended claims.

What is claimed is:

1. In a fluid treating apparatus having a longitudinal axis; means defining a plurality of chambers arranged in a stack along said axis; a first and a second end plate bounding the stacked chambers at opposite axial ends thereof; an inlet port in said first end plate for introducing into the apparatus a fluid to be treated; an outlet port in said second end plate for withdrawing fluid from the apparatus; means defining a central channel extending along said axis for withdrawing from the apparatus a fluid extract; a plurality of fluid-impervious diaphragms situated in a spaced relationship in said chambers in an orientation generally perpendicular to said axis; the fluid being guided along said diaphragms generally radially relative to said axis; the improvement comprising (a) a plurality of support frames arranged in a stack along said axis; each said support frame including an outer ring and an inner ring surrounded by said outer ring; said outer ring and said inner ring each having a radially inner face and a radially outer face relative to said axis; the radially inner face of said outer ring and the radially outer face of said inner ring of each said support frame together define radially outer and radially inner boundaries, respectively, of each of said chambers; the radially outer faces of said outer rings together forming an outer wall face of the apparatus, the radially inner faces of said inner rings surrounding said central channel; each of said outer ring having a radial surface portion arranged to constitute a supporting face engaging a radially outer marginal surface portion of an adjoining said diaphragm; each said support frame comprising a grid situated between said outer and inner rings thereof; each grid being preponderantly out of contact with adjoining said diaphragms; and (b) each said diaphragm having a central aperture in axial alignment with each said inner ring and means for constraining the fluid under treatment to flow along said diaphragms substantially along their entire width measured transversely to said axis.

2. A fluid treating apparatus as defined in claim 1, wherein said support frames have, compared to one another, different axially measured dimensions whereby the volume of the chambers between adjoining said diaphragms varies.

3. A fluid treating apparatus as defined in claim 1, wherein said support frames are in mutual engagement with one another at respective said outer and inner rings thereof; further comprising sealing rings being disposed between each adjoining said outer rings and between each adjoining said inner rings.

4. A fluid treating apparatus as defined in claim 1, wherein said support frames are in mutual engagement with one another at respective said outer and inner rings thereof with an interposition of said marginal surface portion of respective said diaphragms.

5. A fluid treating apparatus as defined in claim 1, wherein each said outer ring has opposite radial faces; further comprising a circumferential seal disposed on at least one of said radial faces.

6. A fluid treating apparatus as defined in claim 1, further comprising a plurality of diaphragm pocket assemblies arranged in a stack along said axis; each said diaphragm pocket assembly including two immediately adjoining diaphragms situated between consecutive two said support frames, a porous mat situated between said two immediately adjoining diaphragms and a sealing edge hermetically joining radially outer peripheral portions of said two immediately adjoining diaphragms.

7. A fluid treating apparatus as defined in claim 6, wherein said mat has a thickness which increases as viewed radially inwardly relative to said axis.

8. A fluid treating apparatus as defined in claim 7, wherein said mat is formed of a plurality of mat layers.

9. A fluid treating apparatus as defined in claim 6, wherein said mat includes a pressure-resistant disc.

10. A fluid treating apparatus as defined in claim 1, wherein each said support frame further comprises a seal surrounding and being in engagement with said radially outer face of said inner ring.

11. A fluid treating apparatus as defined in claim 1, further comprising a seal surrounding said inner ring and being in sealing engagement with said inner ring and a surface portion of an adjoining said diaphragm.

12. A fluid treating apparatus as defined in claim 1, wherein said means for guiding the fluid along said diaphragms comprises a passage provided solely at a single radially outer marginal zone of each diaphragm to allow passage of fluid under treatment axially through the diaphragms solely at said single outer marginal zone.

13. A fluid treating apparatus as defined in claim 1, wherein each grid is in a supporting contact with an adjoining said diaphragm solely along outer marginal zones thereof.

14. A fluid treating apparatus as defined in claim 13, wherein the grids have raised dots being in a supporting contact with respective adjoining diaphragms.

* * * * *